(12) United States Patent
Qiu et al.

US011448926B2

(10) Patent No.: US 11,448,926 B2
(45) Date of Patent: Sep. 20, 2022

(54) LIQUID CRYSTAL DISPLAY

(71) Applicant: Huizhou China Star Optoelectronics Technology Co., Ltd., Huizhou (CN)

(72) Inventors: Yongyuan Qiu, Huizhou (CN); Linlin Fu, Huizhou (CN); Cong Luo, Huizhou (CN); Xi Cheng, Huizhou (CN)

(73) Assignee: Huizhou China Star Optoelectronics Techmnology Co., Ltd., Huizhou (CN)

( * ) Notice: Subject to any disclaimer, the term of this patent is extended or adjusted under 35 U.S.C. 154(b) by 130 days.

(21) Appl. No.: 16/626,358

(22) PCT Filed: Nov. 22, 2019

(86) PCT No.: PCT/CN2019/120158
§ 371 (c)(1),
(2) Date: Dec. 24, 2019

(87) PCT Pub. No.: WO2021/092999
PCT Pub. Date: May 20, 2021

(65) Prior Publication Data
US 2021/0294145 A1   Sep. 23, 2021

(30) Foreign Application Priority Data

Nov. 12, 2019 (CN) .......................... 201911099273.5

(51) Int. Cl.
*G02F 1/1345* (2006.01)
*G02F 1/1335* (2006.01)
*G02F 1/13357* (2006.01)

(52) U.S. Cl.
CPC .... *G02F 1/13456* (2021.01); *G02F 1/133528* (2013.01); *G02F 1/133603* (2013.01); *G02F 1/133605* (2013.01); *G02F 1/133612* (2021.01)

(58) Field of Classification Search
CPC ........... G02F 1/13456; G02F 1/133612; G02F 1/133528; G02F 1/133603; G02F 1/133605
USPC ......................... 349/61–70, 106–109, 61–64
See application file for complete search history.

(56) References Cited

U.S. PATENT DOCUMENTS

| 8,477,258 B2* | 7/2013 | Wang ................ G02F 1/133603 349/68 |
| 2004/0105265 A1* | 6/2004 | Takizawa ............... G02B 5/223 362/293 |
| 2005/0146897 A1* | 7/2005 | Mimura ............... G02B 6/0053 362/623 |
| 2012/0235948 A1* | 9/2012 | Inoue .................. G02F 1/13338 345/173 |
| 2014/0340625 A1 | 11/2014 | Hsu et al. |
| 2017/0199429 A1* | 7/2017 | Kang .................. G02F 1/13439 |
| 2019/0025629 A1* | 1/2019 | Yang ................ G02F 1/133603 |
| 2019/0094619 A1 | 3/2019 | Park et al. |
| 2019/0204669 A1* | 7/2019 | Lee ........................ H01L 23/498 |

(Continued)

FOREIGN PATENT DOCUMENTS

| CN | 103472607 | 12/2013 |
| CN | 108153024 | 6/2018 |

(Continued)

*Primary Examiner* — Charles S Chang

(57) ABSTRACT

The present invention provides a display, the display includes: an array substrate; a color filter substrate disposed above the array substrate; a backlight disposed on the color filter substrate; and a reflector disposed on the backlight.

16 Claims, 1 Drawing Sheet

(56) References Cited

U.S. PATENT DOCUMENTS

| | | | |
|---|---|---|---|
| 2019/0243187 A1* | 8/2019 | Liu | ................... G02F 1/133514 |
| 2019/0245006 A1 | 8/2019 | Tsai et al. | |
| 2021/0034182 A1* | 2/2021 | Zheng | ............... G02F 1/133331 |

FOREIGN PATENT DOCUMENTS

| | | |
|---|---|---|
| CN | 109581737 | 9/2020 |
| CN | 109683363 | 9/2020 |
| TW | 201935099 | 9/2019 |

* cited by examiner

LIQUID CRYSTAL DISPLAY

RELATED APPLICATIONS

This application is a National Phase of PCT Patent Application No. PCT/CN2019/120158 having International filing date of Nov. 22, 2019, which claims the benefit of priority of Chinese Patent Application No. 201911099273.5 filed on Nov. 12, 2019. The contents of the above applications are all incorporated by reference as if fully set forth herein in their entirety.

FIELD AND BACKGROUND OF THE INVENTION

The present invention relates to a field of display, and more particularly to a display having a simplified circuit structure.

A miniature light-emitting diode (mini-LED) has a small size and is used to realize ultra-thin multi-partition display, which is a current development direction of the industry. At present, the industry introduces the mini-LED as a backlight to a crystal liquid crystal display (LCD) to achieve ultra-thin, high-brightness and multi-partition. As a number of partitions increases, an active matrix (AM) driving method is proposed. This method is implemented by adopting a glass substrate to form a TFT structure and scanning.

In order to further reduce manufacturing cost of the display, there is an urgent need to develop a new display design.

SUMMARY OF THE INVENTION

In view of this, the present invention provides a new display which replaces a printed circuit board (PCB) substrate in a backlight with a TFT circuit (active driving) or a serial-parallel circuit (passive driving) formed on an outer surfaces of a color filter (CF) substrate and a transistor (TFT) substrate, and a surface of a light emitting diode (LED) is mounted on the color filter (CF) substrate and the transistor (TFT) substrate, wherein the LED is forwardly emitted, and reflected by a reflector to passes through the color filter (CF) substrate and the transistor (TFT) substrate to serve as a backlight source. Accordingly, the display provided by the present invention is simplified in a circuit structure by combining the LED and a panel, thereby achieving the object of reducing the cost.

Accordingly, in accordance with an embodiment of the present invention, the present invention provides a display including: an array substrate; a color filter substrate disposed above the array substrate; a backlight disposed on the color filter substrate; and a reflector disposed on the backlight, wherein the backlight emits light away from the color filter substrate, the light is reflected by the reflector and then passes through the color filter substrate and the array substrate, and the display further includes a liquid crystal layer and a built-in polarizer disposed between the color filter substrate and the array substrate.

According to an embodiment of the present invention, a first circuit driving device disposed under the array substrate; a first circuit trace disposed on the color filter substrate, and extending outward beyond the color filter substrate and bent under the array substrate to electrically connect the first circuit driving device; a second circuit driving device disposed under the array substrate; and a second circuit trace disposed on an upper surface of an edge of the array substrate, and extending outward beyond the array substrate and bent under the array substrate to electrically connect the second circuit driving device, wherein the first circuit driving device is configured to drive the backlight on the color filter substrate through a first circuit trace, and the second circuit driving device is configured to drive a transistor on the array substrate through the second circuit trace.

According to an embodiment of the present invention, the second circuit driving device is disposed between the first circuit driving device and the array substrate such that the first circuit trace is closer to an outside of the display than the second circuit trace.

According to an embodiment of the present invention, the display further includes: a circuit driving device disposed under the array substrate; a circuit trace disposed on the color filter substrate, extending outwardly and bent downwardly along a sidewall of the color filter substrate and a sidewall of the array substrate to form an electrical connection therewith, and then bent under the array substrate to electrically connect the circuit driving device, wherein the circuit trace is configured to connect the array substrate, to electrically connect the backlight and the array substrate to the circuit driving device, and the circuit driving device is configured to drive the backlight on the color filter substrate and the transistor on the array substrate through the circuit trace.

According to an embodiment of the present invention, the array substrate includes anyone of an active array substrate and a passive array substrate.

According to an embodiment of the present invention, the backlight includes a plurality of light emitting diodes and/or a plurality of miniature light emitting diodes.

According to an embodiment of the present invention, a surface the reflector has a reflective brightness enhancing film material for polarizing light.

According to an embodiment of the present invention, the reflector has an atomizing surface for homogenizing light.

According to another embodiment of the present invention, the present invention also provides a display including: an array substrate; a color filter substrate disposed above the array substrate; a backlight disposed on the color filter substrate; and a reflector disposed on the backlight.

According to an embodiment of the present invention, the display further includes: a first circuit driving device disposed under the array substrate; a first circuit trace disposed on the color filter substrate, and extending outward beyond the color filter substrate and bent under the array substrate to electrically connect the first circuit driving device; a second circuit driving device disposed under the array substrate; and a second circuit trace disposed on an upper surface of an edge of the array substrate, and extending outward beyond the array substrate and bent under the array substrate to electrically connect the second circuit driving device, wherein the first circuit driving device is configured to drive the backlight on the color filter substrate through a first circuit trace, and the second circuit driving device is configured to drive a transistor on the array substrate through the second circuit trace.

According to an embodiment of the present invention, the second circuit driving device is disposed between the first circuit driving device and the array substrate such that the first circuit trace is closer to an outside of the display than the second circuit trace.

According to an embodiment of the present invention, the display further includes: a circuit driving device disposed under the array substrate; a circuit trace disposed on the color filter substrate, extending outwardly and bent downwardly along a sidewall of the color filter substrate and a sidewall of the array substrate to form an electrical connection therewith, and then bent under the array substrate to electrically connect the circuit driving device, wherein the circuit trace is configured to connect the array substrate, to thereby electrically connect the backlight and the array substrate to the circuit driving device, and the circuit driving device is configured to drive the backlight on the color filter substrate and the transistor on the array substrate through the circuit trace.

According to an embodiment of the present invention, the array substrate includes anyone of an active array substrate and a passive array substrate.

According to an embodiment of the present invention, the backlight includes a plurality of light emitting diodes and/or a plurality of miniature light emitting diodes.

According to an embodiment of the present invention, the backlight emits light away from the color filter substrate, the light is reflected by the reflector and then passes through the color filter substrate and the array substrate.

According to an embodiment of the present invention, a surface the reflector has a reflective brightness enhancing film material for polarizing light.

According to an embodiment of the present invention, the reflector has an atomizing surface for homogenizing light.

According to an embodiment of the present invention, the display further includes a liquid crystal layer and a built-in polarizer disposed between the color film substrate and the array substrate.

The present invention provides a new display which replaces a printed circuit board (PCB) substrate in a backlight with a TFT circuit (active driving) or a serial-parallel circuit (passive driving) formed on an outer surfaces of a color filter (CF) substrate and a transistor (TFT) substrate, and a surface of a light emitting diode (LED) is mounted on the color filter (CF) substrate and the transistor (TFT) substrate, wherein the LED is forwardly emitted, and reflected by a reflector to passes through the color filter (CF) substrate and the transistor (TFT) substrate to serve as a backlight source. Accordingly, the display provided by the present invention is simplified in a circuit structure by combining the LED and a panel, thereby achieving the object of reducing the cost.

BRIEF DESCRIPTION OF THE SEVERAL VIEWS OF THE DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DESCRIPTION OF SPECIFIC EMBODIMENTS OF THE INVENTION

Figure 1:
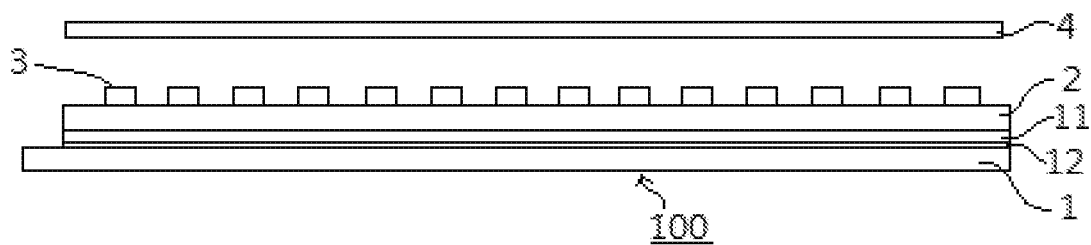
FIG. 1 is a schematic diagram of a display according to an embodiment of the present invention.

In order to make the above description of the present invention more comprehensible, the preferred embodiments are described below in detail with reference to the accompanying drawings.

The following description of the various embodiments is provided to illustrate the specific embodiments of the present invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the present invention. In the figures, structurally similar elements are denoted by the same reference numerals.

The following disclosure provides many different embodiments, or examples, for implementing different features of the present invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In order to further reduce the manufacturing cost of the display, an embodiment of the present invention provides a new display which replaces a printed circuit board (PCB) substrate in a backlight with a TFT circuit (active driving) or a serial-parallel circuit (passive driving) formed on an outer surfaces of a color filter (CF) substrate and a transistor (TFT) substrate, and a surface of a light emitting diode (LED) is mounted on the color filter (CF) substrate and the transistor (TFT) substrate, wherein the LED is forwardly emitted, and reflected by a reflector to passes through the color filter (CF) substrate and the transistor (TFT) substrate to serve as a backlight source. Accordingly, the display provided by the present invention is simplified in a circuit structure by combining the LED and a panel, thereby achieving the object of reducing the cost.

FIG. 1 is a schematic diagram of a display in accordance with an embodiment of the present invention. Referring to FIG. 1, specifically, a display 100 of this embodiment of the present invention includes: an array substrate 1; a color filter substrate 2 is disposed above the array substrate 1; a backlight 3 is disposed on the color filter substrate 2; and a reflector 4 is disposed on the backlight 3.

In this embodiment, one side of the array substrate 1 includes an area not covered by the color filter substrate 2, that is, the array substrate 1 only partially corresponds to the color filter substrate 2. Alternatively, one side of the array substrate 1 may also completely corresponds to the color filter substrate 2.

In the above embodiment, if one side of the array substrate 1 includes an area not covered by the color filter substrate 2, a liquid crystal layer 11 of the display is controlled from the array substrate 1, and the backlight 3 is controlled from the color filter substrate 2. Such a design can use a dual-drive device (X-board), and required to be a chip on flex/chip on film (COF) structural design. Alternatively, to further reduce the cost, one side of the array substrate 1 may completely correspond to the color filter substrate 2, and a single driving device (X-board) is used. In such a case, the array substrate and the color filter substrate are bonded by side bonding in a same chip-on-film structure. Details of the above designs will be further explained in the examples below.

Figure 2:
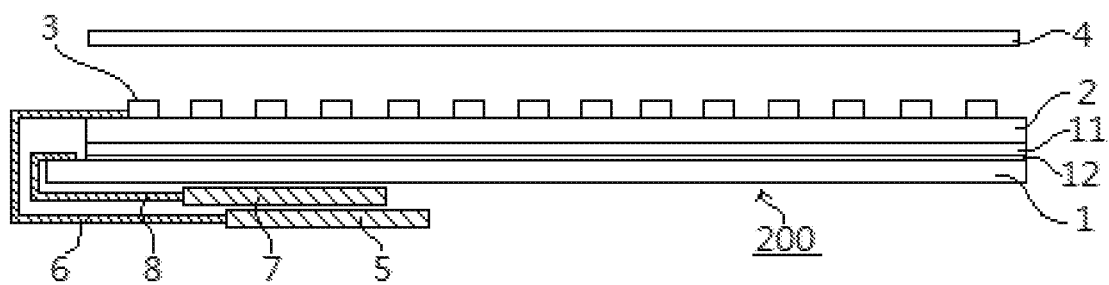
FIG. 2 is a schematic diagram of a display according to another embodiment of the present invention.

FIG. 2 is a schematic diagram of a display in accordance with another embodiment of the present invention. Referring to FIG. 2, in particular, a display 200 of this embodiment of the present invention further includes: a first circuit driving device 5 disposed under the array substrate 1; a first circuit trace 6 disposed on the color filter substrate 2, and extending outward beyond the color filter substrate 2 and bent under the array substrate 1 to electrically connect the first circuit driving device 5; a second circuit driving device 7 disposed under the array substrate 1; and a second circuit trace 8 disposed on an upper surface of an edge of the array substrate 1, and extending outward beyond the array substrate 1 and bent under the array substrate 1 to electrically connect the second circuit driving device 7, wherein the first circuit driving device 5 is configured to drive the backlight 3 on the color filter substrate 2 through a first circuit trace 6, and the second circuit driving device 7 is configured to drive a transistor (not shown) on the array substrate 1 through the second circuit trace 8.

As shown in FIG. 2, according to an embodiment of the present invention, the second circuit driving device 7 is disposed between the first circuit driving device 5 and the array substrate 1, such that the first circuit trace 6 is closer to an outside of the display 200 than the second circuit trace 8.

Still referring to FIG. 2, in this embodiment, one side of the array substrate 1 includes an area not covered by the color filter substrate 2. In this case, the liquid crystal layer 11 of the display is controlled from the array substrate 1, and the backlight 3 is controlled from the film substrate 2. This design can adopt a dual-drive device (X-board), and required to be a design having a chip on flex/chip on film (COF) structure.

Figure 3:
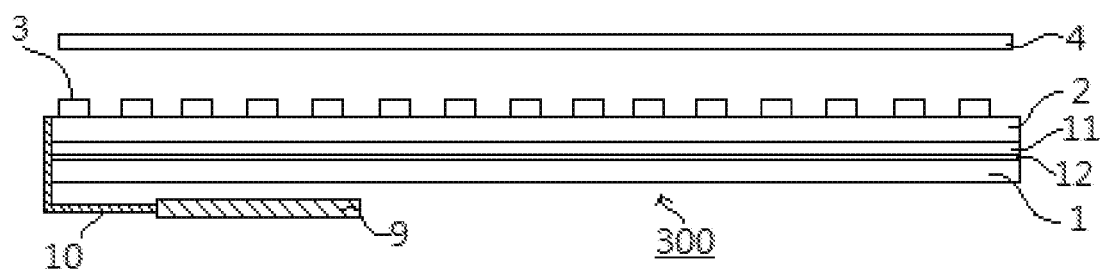
FIG. 3 is a schematic diagram of a display according to still another embodiment of the present invention.

FIG. 3 is a schematic diagram of a display according to still another embodiment of the present invention. Referring to FIG. 3, in particular, a display 300 of this embodiment of the present invention further includes: a circuit driving device 9 disposed under the array substrate 1;

a circuit trace 10 disposed on the color filter substrate 2, extending outwardly and bent downwardly along a sidewall of the color filter substrate 2 and a sidewall of the array substrate 1 to form an electrical connection therewith, and then bent under the array substrate 1 to electrically connect the circuit driving device 9, wherein the circuit trace 10 is configured to connect the array substrate 1, to electrically connect the backlight 3 and the array substrate 1 to the circuit driving device 9, and the circuit driving device 9 is configured to drive the backlight 3 on the color filter substrate 2 and the transistor (not shown) on the array substrate 1 through the circuit trace 10.

Still referring to FIG. 3, in the above embodiment, to further reduce the cost, one side of the array substrate 1 completely corresponds to the color filter substrate 2, and a single driving device (X-board) is used, to bond the array substrate and the color filter substrate by side bonding in a same chip-on-film structure for further cost down. D According to an embodiment of the present invention, the array substrate 1 includes any one of an active array substrate and a passive array substrate.

According to an embodiment of the present invention, the backlight 3 includes a plurality of light emitting diodes and/or a plurality of miniature light emitting diodes.

As shown in FIG. 1, according to an embodiment of the present invention, the backlight 3 emits light away from the color filter substrate 2, and the light is reflected by the reflector 4 and then passes through the color filter substrate 2 and the array substrate 1.

According to an embodiment of the present invention, a surface the reflector 4 has a reflective brightness enhancing film material for polarizing light.

According to an embodiment of the present invention, the reflector 4 has an atomizing surface for homogenizing light.

As shown in FIG. 1, according to an embodiment of the present invention, the display 100 further includes a liquid crystal layer 11 and a built-in polarizer 12 disposed between the color filter substrate 2 and the array substrate 1.

Accordingly, embodiments of the present invention provide a new display which replaces a printed circuit board (PCB) substrate in a backlight with a TFT circuit (active driving) or a serial-parallel circuit (passive driving) formed on an outer surfaces of a color filter (CF) substrate and a transistor (TFT) substrate, and a surface of a light emitting diode (LED) is mounted on the color filter (CF) substrate and the transistor (TFT) substrate, wherein the LED is forwardly emitted, and reflected by a reflector to passes through the color filter (CF) substrate and the transistor (TFT) substrate to serve as a backlight source. Accordingly, the display provided by the present invention is simplified in a circuit structure by combining the LED and a panel, thereby achieving the object of reducing the cost.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display, comprising:
   an array substrate;
   a color filter substrate disposed above the array substrate;
   a backlight comprising a plurality of light emitting diodes and/or a plurality of miniature light emitting diodes directly disposed at intervals on the color filter substrate; and
   a reflector disposed on the backlight,
   wherein the backlight emits light away from the color filter substrate, the light is reflected by the reflector and then passes through the color filter substrate and the array substrate, and the display further comprises a liquid crystal layer and a built-in polarizer disposed between the color filter substrate and the array substrate.

2. The display according to claim 1 wherein said display further comprises:
   a first circuit driving device disposed under the array substrate;
   a first circuit trace disposed on the color filter substrate, and extending outward beyond the color filter substrate and bent under the array substrate to electrically connect the first circuit driving device;
   a second circuit driving device disposed under the array substrate; and
   a second circuit trace disposed on an upper surface of an edge of the array substrate, and extending outward beyond the array substrate and bent under the array substrate to electrically connect the second circuit driving device, wherein the first circuit driving device is configured to drive the backlight on the color filter substrate through a first circuit trace, and the second circuit driving device is configured to drive a transistor on the array substrate through the second circuit trace.

3. The display according to claim 2, wherein the second circuit driving device is disposed between the first circuit driving device and the array substrate such that the first circuit trace is closer to an outside of the display than the second circuit trace.

4. The display according to claim 1, wherein the display further comprises:

a circuit driving device disposed under the array substrate;

a circuit trace disposed on the color filter substrate, extending outwardly and bent downwardly along a sidewall of the color filter substrate and a sidewall of the array substrate to form an electrical connection therewith, and then bent under the array substrate to electrically connect the circuit driving device, wherein the circuit trace is configured to connect the array substrate, to electrically connect the backlight and the array substrate to the circuit driving device, and the circuit driving device is configured to drive the backlight on the color filter substrate and the transistor on the array substrate through the circuit trace.

5. The display according to claim 1, wherein the array substrate comprises anyone of an active array substrate and a passive array substrate.

6. The display according to claim 1, wherein a surface the reflector has a reflective brightness enhancing film material for polarizing light.

7. The display according to claim 1, wherein the reflector has an atomizing surface for homogenizing light.

8. A display comprising:

an array substrate;

a color filter substrate disposed above the array substrate;

a backlight comprising a plurality of light emitting diodes and/or a plurality of miniature light emitting diodes directly disposed at intervals on the color filter substrate; and a reflector disposed on the backlight.

9. The display according to claim 8, wherein the display further comprises:

a first circuit driving device disposed under the array substrate;

a first circuit trace disposed on the color filter substrate, and extending outward beyond the color filter substrate and bent under the array substrate to electrically connect the first circuit driving device;

a second circuit driving device disposed under the array substrate; and a second circuit trace disposed on an upper surface of an edge of the array substrate, and extending outward beyond the array substrate and bent under the array substrate to electrically connect the second circuit driving device, wherein the first circuit driving device is configured to drive the backlight on the color filter substrate through a first circuit trace, and the second circuit driving device is configured to drive a transistor on the array substrate through the second circuit trace.

10. The display according to claim 9, wherein the second circuit driving device is disposed between the first circuit driving device and the array substrate such that the first circuit trace is closer to an outside of the display than the second circuit trace.

11. The display according to claim 8, wherein the display further comprises:

a circuit driving device disposed under the array substrate;

a circuit trace disposed on the color filter substrate, extending outwardly and bent downwardly along a sidewall of the color filter substrate and a sidewall of the array substrate to form an electrical connection therewith, and then bent under the array substrate to electrically connect the circuit driving device, wherein the circuit trace is configured to connect the array substrate, to thereby electrically connect the backlight and the array substrate to the circuit driving device, and the circuit driving device is configured to drive the backlight on the color filter substrate and the transistor on the array substrate through the circuit trace.

12. The display according to claim 8, wherein the array substrate comprises anyone of an active array substrate and a passive array substrate.

13. The display according to claim 8, wherein the backlight emits light away from the color filter substrate, the light is reflected by the reflector and then passes through the color filter substrate and the array substrate.

14. The display according to claim 8, wherein a surface the reflector has a reflective brightness enhancing film material for polarizing light.

15. The display according to claim 8, wherein the reflector has an atomizing surface for homogenizing light.

16. The display according to claim 8, wherein the display further comprises a liquid crystal layer and a built-in polarizer disposed between the color film substrate and the array substrate.

* * * * *

UNITED STATES PATENT AND TRADEMARK OFFICE
CERTIFICATE OF CORRECTION

PATENT NO. : 11,448,926 B2
APPLICATION NO. : 16/626358
DATED : September 20, 2022
INVENTOR(S) : Qiu et al.

It is certified that error appears in the above-identified patent and that said Letters Patent is hereby corrected as shown below:

On the Title Page

Item (73) Assignee:
"Huizhou China Star Optoelectronics Techmnology Co., Ltd."

Should be changed to:
--Huizhou China Star Optoelectronics Technology Co., Ltd.--

Signed and Sealed this
Sixth Day of June, 2023

Katherine Kelly Vidal
*Director of the United States Patent and Trademark Office*